United States Patent

Freedman

[15] 3,676,687

[45] July 11, 1972

[54] SHADOW EDGE POSITION DETECTOR USING LINEAR ARRAY OF DIODES WITH LOGIC TO GENERATE GRAY CODE

[72] Inventor: Morris D. Freedman, Southfield, Mich.

[73] Assignee: The Bendix Corporation

[22] Filed: Sept. 4, 1970

[21] Appl. No.: 69,755

[52] U.S. Cl. ..........................250/209, 250/214, 250/219 D, 307/216, 307/311

[51] Int. Cl. .................G01n 21/30, H03k 3/42, H03k 19/20

[58] Field of Search ............250/209, 220 M, 220 R, 219 ID, 250/214; 307/216, 311

[56] References Cited

UNITED STATES PATENTS

| | | | |
|---|---|---|---|
| 3,466,602 | 9/1969 | Moser et al. | 307/216 X |
| 3,046,407 | 7/1962 | Hoffman | 250/219 ID |

*Primary Examiner*—James W. Lawrence
*Assistant Examiner*—T. N. Grigsby
*Attorney*—Lester L. Hallacher and Plante, Hartz, Smith and Thompson

[57] ABSTRACT

A system for detecting shadow edges by use of a linear array of photodiodes whose output is a Gray Type Code is described. Because of the unique connections of the diodes into pairs and the appropriate use of logic circuitry, the diodes can be arranged in a linear, or single line, array. As a result of the Gray Code type of output, the shadow edge is unambiguously located within a single diode spacing.

10 Claims, 8 Drawing Figures

INVENTOR
MORRIS D. FREEDMAN

BY Lester T. Hallacher
ATTORNEY

INVENTOR
MORRIS D. FREEDMAN

BY *[signature]*
ATTORNEY

SHADOW EDGE POSITION DETECTOR USING LINEAR ARRAY OF DIODES WITH LOGIC TO GENERATE GRAY CODE

BACKGROUND OF THE INVENTION

Various types of devices for detecting the position of a line of light are presently available in the art. Ordinarily, these devices employ an array of photodiodes which are arranged such that the outputs from the diodes are in the form of a Gray Code.

As is known, a Gray Code is a code which has the unique characteristic that a particular code position is different from the preceding code position by a single pulse. Such a code is advantageous because an erroneous pulse within a pulse position or the ambiguous interpretation of one pulse within a code position can result in a maximum error of a single position thereby greatly decreasing the significance of the error within the coded output. For this reason, when the individual pulses within a pulse position represent the illumination of diodes, an erroneous or ambiguous output from a diode can result in a maximum error of one pulse position.

The presently existing diode arrangements for use with Gray Codes must include a diode for each pulse within a pulse position requiring a logic 1 output. Accordingly, if eight bits of accuracy are required for the pulse output, a total of 1024 diodes is required.

A better understanding of this concept can be obtained by viewing FIGS. 1, 2, and 3. In FIG. 1, the diode array 10 is formed from a series of diodes 11 arranged in a matrix having alphabetically identified columns and numerically identified rows.

The positioning of the diodes 11 within the matrix 10 of FIG. 1 is consistent with the positioning of the ONE pulses of the code shown in FIG. 2. The code shown in FIG. 2 is a Gray Type of code so that each column of pulses is different from the preceding column by a single pulse only. For this reason, an error of any of the 1 pulses results in a maximum positional error of one position. Accordingly, if one of the diodes 11, which is illuminated by the light line 13 or a diode which is immediately adjacent to the illuminated column of diodes gives an erroneous or ambiguous output, the error results in a maximum of a one position error in the final readout. As an example, if the light beam illuminates Column C and an error is present, the output will appear as Column B or D.

Further explaining the correlation between the code of FIG. 2 with the diode arrangement of FIG. 1, it should be noted that the presence of a diode in the column represents the presence of a logic 1 output in the column of the code. Accordingly, in the B column of the code, a diode is placed in the 1 row where there is a logic 1 output of the code and the array has no diodes in the 2 and 3 rows where the code has a logic 0 output. However, in referring to the C column, the 1 and 2 rows require diodes while the 3 row does not require a diode. For this reason, the very simple code shown in FIG. 2 requires 12 diodes in the diode array.

The manner of utilizing the diode array is shown with respect to FIG. 3. All the diodes of a single row are connected to a common output 12. The diodes in the B, C, G, and H columns are, therefore, connected to a common output terminal which serves as the row 1 output. In a similar manner, all the diodes of the other rows are connected to an output terminal which serves the entire row. The three outputs are combined to give the required pulse output as illustrated in the code shown in FIG. 2.

Assuming that a beam of light 13 as illustrated in FIG. 1 illuminates diodes in the C column, the two diodes within the C column each yield a pulse output. However, the other diodes are all unactuated and no output is obtained for any diodes in an adjacent column. Therefore, a coded output consistent with that of line C of the code of FIG. 2 is obtained. An error in the positioning of the light beam 3 for example, such as would be obtained if the diodes were only partially illuminated by the light beam would yield a situation whereby either the code of column B or that of Column D could be obtained. For this reason, the maximum error would be a single position error as compared with the absolute position of the shadow.

Although the devices employing two dimensional arrays such as that illustrated in FIG. 1 have some utility they also have inherent disadvantages. One disadvantage stems from the fact that a plurality of diodes is required in each of the columns. This greatly increases the number of diodes required for a system and thereby significantly increases the cost of fabrication of the diode arrays. Furthermore, because the arrangement is two dimensional, it is difficult to fabricate the diode arrays by use of integrated circuit techniques.

Another disadvantage of the prior art systems stems from the fact that the operation of the systems requires that only one column of diodes is illuminated at a given time. The systems are, therefore, useful in detecting the location of narrow beams of light, such as beam 13 of FIG. 1. However, these systems cannot be used to detect the edges of shadows because all the diodes within the array which are not protected by the shadow are simultaneously illuminated.

NEW TOPICS ONLY OF THE INVENTION

The inventive system overcomes the disadvantages of the prior art systems in that it is useful in detecting the edges of shadows and employs an array of diodes which can be arranged along a single line. The inventive system, therefore, readily lends itself to fabrication by use of integrated circuit techniques and simultaneously substantially reduces the number of diodes required for a particular bit accuracy of the system. As an example, if eight bit resolution is required from the system, only 255 diodes are required as opposed to the 1024 diodes required of the prior art system.

The unique operation of the inventive system is obtained by connecting the photodiodes in pairs such that a Gray Type Code is followed. The connections of the diodes into pairs are made so that the logic 1 output is obtained when a single diode of a pair is illuminated, while a logic 0 is obtained when both of the diodes of a pair are either illuminated or darkened. The inventive system is, therefore, useful in detecting the edges of shadows and accordingly is useful in measuring fabricated parts and other usages where shadows are indicative of a desired characteristic of the part.

DETAILED DESCRIPTION

Figure 1:
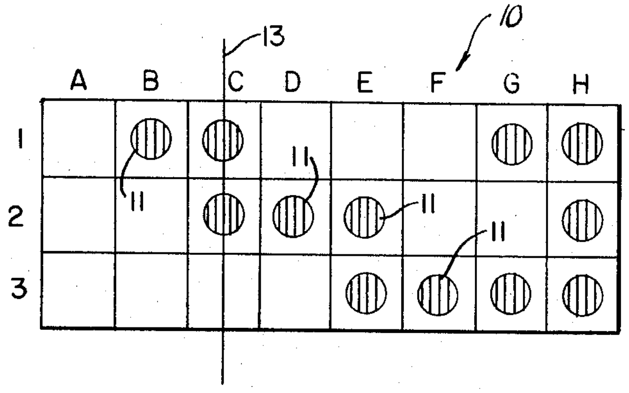
FIG. 1. PRIOR ART
FIG. 1 is a diode array of the type used in the prior art devices.
Figure 2:
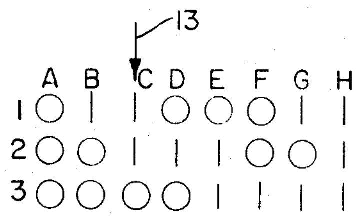
FIG. 2. PRIOR ART
FIG. 2 is a Gray Code having three bit accuracy.
Figure 3:
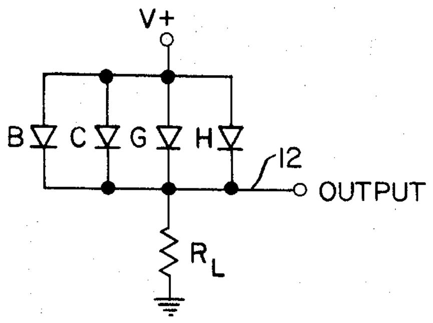
FIG. 3. PRIOR ART
FIG. 3 is a simplified showing of the circuit arrangement for the diode array of FIG. 1.
Figure 4:
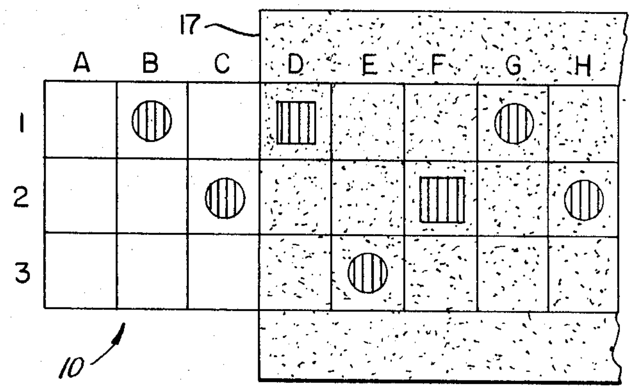
FIG. 4 is a diode arrangement similar to one used for the inventive system and useful in explaining the operation of the inventive system.

As explained hereinabove, the diode array of FIG. 1 is useful in detecting the position of a line of light 13 so that a pulse output which is consistent with the Gray Code shown in FIG. 2 is obeyed. The three bit accuracy of the code of FIG. 2 requires the use of 12 diodes when using a two dimensional array such as that shown in FIG. 1. FIG. 4 shows a diode array which is consistent with the Gray Code of FIG. 2 and which employs only seven diodes. The substantial reduction in the number of diodes required for the arrangement shown in FIG.

4 as compared to the number of diodes required for the arrangement of FIG. 1 is realized by connecting the diodes in a manner more fully described hereinafter. It should also be noted that each column requires a diode in only one row of the FIG. 4 arrangement. This permits the use of a linear diode array.

Figure 5:
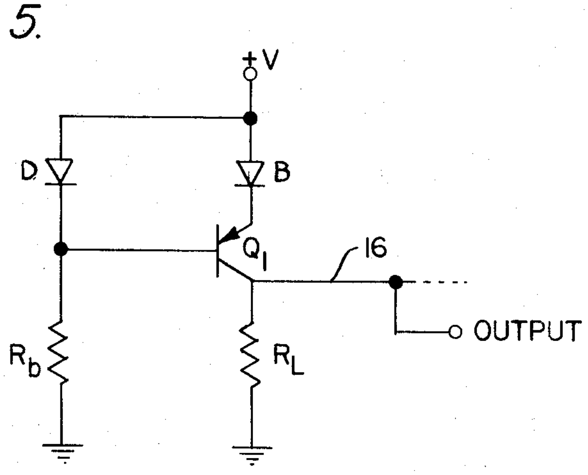
FIG. 5 is a simplified schematic diagram of the logic circuitry used with the inventive system.

In FIG. 4 two of the diodes are shown as having square configurations while the remaining diodes have a circular configuration. This is done to simplify the understanding of the operation of the system because as an actual matter all of the diodes would be identical in both configuration and operational characteristics. Furthermore, although the transducers are described as light sensitive diodes other types of transducers can be used in the inventive system. In the FIG. 4 array, the first circular diode and the first square diode, which appear in a row are connected into a pair. V The manner of connecting the diodes within a pair is illustrated with respect to FIG. 5. The logic circuit of FIG. 5 includes a transistor $Q_1$ having a collector resistor $R_L$ from which the output of the circuit is taken. The base of the transistor is connected to ground through a resistor $R_b$. The diodes which constitute a pair of diodes within the array of FIG. 4 are individually connected to the base and emitter electrodes of the transistor $Q_1$. The diodes shown as circular in FIG. 4 are connected to the emitter of a transistor while the diodes shown as squares are connected to the base of the corresponding transistor. The anodes of the diodes are then connected to a biasing voltage source $V^+$. FIG. 5 shows the connection of diodes B and D into the transistor circuit and accordingly the circular and square diodes B and D respectively of Row 1 or FIG. 4 are shown in the circuit of FIG. 5. Because the two diodes which constitute a pair are individually connected to the base and emitter of the same transistor, each pair of diodes actuates a single transistor. For this reason, if an eight bit accuracy code is utilized, an array similar to the array shown in FIG. 4 would include 255 photodiodes connected into 128 pairs, thereby requiring 128 transistors. This is more fully explained hereinafter with respect to FIGS. 6 and 7 where a four bit code is used. An eight bit code is not illustrated because of the length and complexity of the code, and further because one skilled in the art understanding the application of the system to a three or four bit code can easily adapt the system to an eight bit code. Any Gray Type Code can be used with the system irrespective of the number of bits of accuracy required of the code and a bit accuracy higher than eight can be obtained simply by using the required number of energy transducers.

The operation of a circuit of FIG. 5 is quite simple. For a given pair of diodes such as B and D as illustrated, if neither diode is illuminated the collector current of transistor $Q_1$ is zero and there is no output on line 16. However, if only diode B is illuminated, there will be a current flow through the collector of transistor $Q_1$ because resistor $R_b$ draws current through the base, and because diode D provides a low resistance path for the emitter. In this case the output present on output terminal 16 will be a logical 1. If diode D is also illuminated, then transistor $Q_1$ is cut off because current flowing through the diode B and the resistor $R_b$ back biases the transistor $Q_1$. Accordingly, no collector current flows and there is no output pulse on terminal 16, which is a logical 0 condition.

This operation of the logic circuit of FIG. 5 readily lends the diode array of FIG. 4 to operation with the Gray Type of code illustrated in FIG. 2. In correlating the diode array of FIG. 4 with the code of FIG. 2, it is best to first assume that the shadow edge 17 first falls between the Columns A and B of the diode array. In this position, the code of FIG. 2 dictates a logic 0 output. This is realized because no diodes are present in Column A of the array. As the shadow moves to the right so that it appears between Columns B and C, the code of Fig. 2 dictates that the output contains a logical 1 output in the one row position and a logic 0 in the two and three row positions. This is obtained from the array of FIG. 4 because of the presence of the diode in the B column. As the shadow edge 17 proceeds toward the right so that it appears between Columns D and E, the code of FIG. 2 requires a logic 0 in the one and three row positions and a logic ONE in the two row position. This is obtained because the diode in the D column which is comparable to diode D in FIG. 5 is now illuminated, and therefore, the transistor $Q_1$ of FIG. 5 is cut off and a logic 0 is obtained in this position. The logic 1 required from the row 2 position is obtained because the diode in the C column of row 2 is now illuminated. This diode is paired with the diode in Column F and row 2 which is still shadowed by the shadow 17. Therefore, a logic 1 output will be present until the Column F, row 2 diode is illuminated. Reference to FIG. 2 shows that this is required by the code. A 0 is obtained in the row 3 position because there is no diode illuminated in this position. Accordingly, the output will read 010 with the shadow edge 17 between Columns D and E, as required by the code of FIG. 2. This type of operation continues as the shadow 17 traverses the diode array of FIG. 4, and it is, therefore, evident that the Gray Type Code of FIG. 2 is realized simply by connecting the diodes in the proper pair combinations. The output for row 1 is presented on an output lead which serves row 1. Accordingly, the outputs of each diode pair in row 1 are coupled to the same output terminal. In a like manner, all diode pairs within the other rows feed their outputs to output terminals which are common to a particular row. If the Gray Code employed has four bit accuracy, there will be one output terminal for each of the four rows of the code. If the Gray Code has 12 bit accuracy, there will be 12 output terminals, one for each row of the code.

Although the diode array shown in FIG. 4 is illustrated as a two dimensional array, this is done to more easily correlate the array with the column and row designations of the code shown in FIG. 2. However, it should be noted that each of the lettered columns contains a single diode, and therefore, the row positioning of the diodes is immaterial to the system. For this reason, all the diodes within the array of FIG. 4 can be placed into a single one of the rows resulting in a linear array. The array of FIG. 4, therefore, lends itself to integrated circuit techniques because the entire array can be built on a single chip and the logic circuitry can also be built on the same chip.

It should be noted that the logic circuit shown in FIG. 5 is exemplary only as various types of logic circuitry available can be used for this purpose. In essence, the logic circuitry must perform three functions. Firstly, the circuit must contain a threshold which renders it insensitive to spurious signals and noises in the system. Secondly, the circuit must invert the signal obtained from the second diode of the pair so that a logic 0 is obtained in those instances in which both diodes are illuminated, and therefore, which would ordinarily result in a logic 1 output. Thirdly, the system must contain an AND function so that two inputs of a logic 1 and a logic 0 which has been inverted yield a logic ONE output as required for the system. These three functions are performed by the circuit shown in FIG. 5, but obviously can be performed by many other types of logic circuits.

It should also be noted that because all the diode pairs within a row are connected to a common output terminal, the system also includes an OR function. Thus if any diode pair within a row yields a logic 1 output, the output present in the output terminal for that row is a logic 1.

Figure 6:
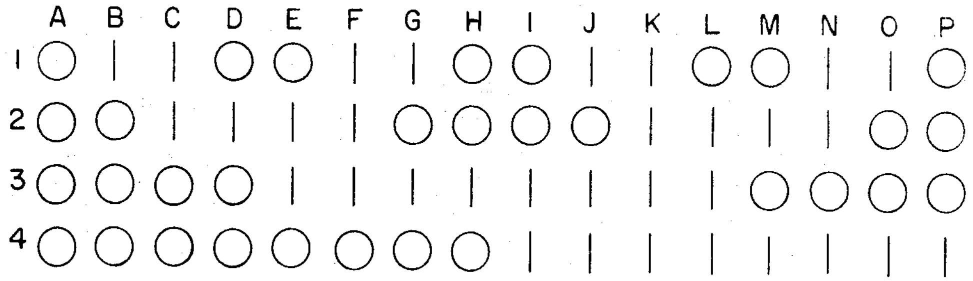
FIG. 6 is a Gray Type of code having four bit accuracy.
Figure 7:
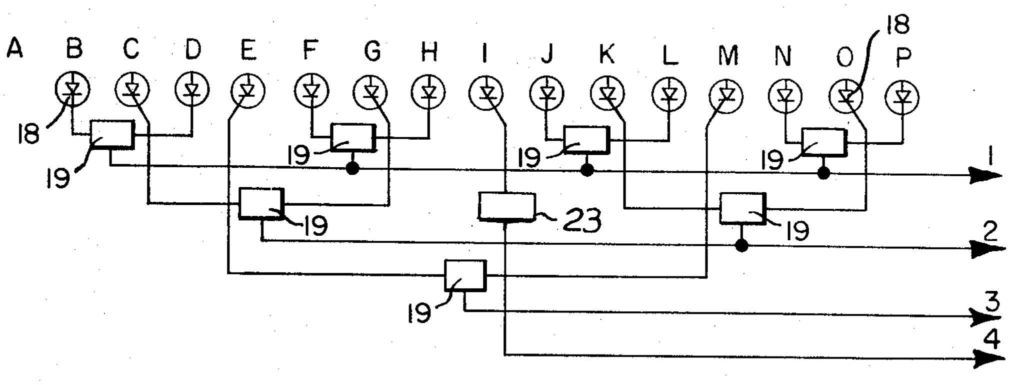
FIG. 7 is a diagram showing the connection of the linear diode array used in the inventive system for rendering an output consistent with the Gray Code of FIG. 6.

The ready expansion of the system to higher orders of accuracy is illustrated with respect to FIGS. 6 and 7. FIG. 6 is a code having four bit accuracy and FIG. 7 is the connection of the diode pairs necessary for obtaining the code according to FIG. 6.

In FIG. 7 all the diodes 18 appear in a single linear array with the diodes connected in pairs as shown. The paired connections of the diodes are made through the logic circuits 19 which perform those functions enumerated hereinabove. Furthermore, each of the output terminals one to four is connected to the logic circuits 19, which serve the diode pairs within a row. This results in the OR function mentioned above. The logic circuits 19 can, therefore, be identical to that illustrated in FIG. 5 or any of the various other logic circuits available in the art. The linear array of diodes shown in FIG. 7 requires only 15 diodes in order to operate consistently with the code shown in FIG. 6. Consequently, the circuit of FIG. 7 requires only seven of the logic circuits 19. Therefore, by using the logic circuit configuration shown in FIG. 5, each of the logic circuits will be a simple transistor and two resistors. Diode I is also shown connected to a logic circuit 23. This circuit is required in order to establish the threshold function, the inverting and AND functions are not required, and therefore, the logic circuit 23 can be different from the circuits 19. All the elements of the array, including the diodes, are readily made by integrated circuit techniques, and therefore, the entire circuit of FIG. 7 can be fabricated on a single chip. It should also be noted that each chip can contain a number of rows of diodes, and therefore, the yield rate of the fabrication can be increased because bad diodes in one row can be replaced with the good diodes appearing in the same column of another row. It is, therefore, possible to simultaneously fabricate several rows and eliminate bad diodes by the connection of good diodes within the same column of other rows.

The correlation of the linear array of FIG. 7 with the code of FIG. 6 is readily apparent when it is realized that the first incidence of a logic 1 in each group of logic 1's, the code requires a diode in the array. After a diode is initially illuminated, the logic output from the logic circuit 19 must remain a 1 until the code shows a 0. In order to change the output from the logic circuit corresponding to an illuminated diode into a o, it is necessary to couple it with another illuminated diode. Consider the B, C, and D columns of the code which are:

$$B = 1000$$

$$C = 1100$$

$$D = 0100$$

With the shadow edge between diodes B and C of FIG. 7, diode B is illuminated, and therefore, the output on output line 1 is a logic 1, and output lines 2, 3, and 4 are logic 0, as required by the code.

When the shadow edge is between diodes C and D, diodes B and C are illuminated and the outputs on lines 1–4 respectively are 1100, as required by the code.

When the shadow edge is between diodes D and E, diodes B, C, and D are illuminated. The illumination of diode D, which is paired with diode B causes a logic 0 on output line 1, diode C is still illuminated and is paired with an unilluminated diode G, and therefore, the output on line 2 is a logic 1. The output, therefore, reads 0100, as required by the code.

The output from the logic circuit fed by diode C remains a logic 1 until diode G is illuminated, at which time it changes to o. This is also consistent with the code.

By similarily following through the remainder of the array, the code of FIG. 6 is obtained.

Figure 8:
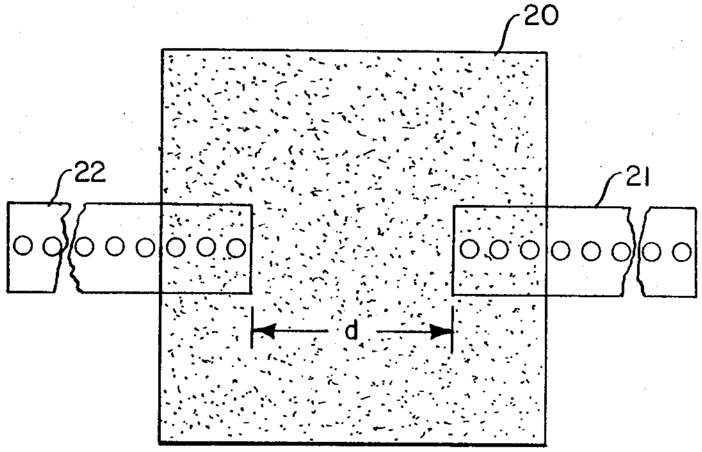
FIG. 8 shows the use of two of the inventive diode arrays used to measure a shadow cast by an element which is being measured.

Fig. 8 illustrates one manner of using the inventive diode array in measuring the linear dimensions of machined parts. A shadow of the part to be measured is cast upon a background and two arrays of diodes arranged to intercept the shadows. The distance (*d*) between the two arrays and the linear outputs from the two arrays are added to indicate the total dimension of the part under consideration.

It should be noted that the two arrays of diodes 21 and 22 receive the right and left edge of the shadow 20, respectively. For this reason, it is necessary to reverse the order of diodes in the array 21 from that of the array 22.

In the embodiments discussed hereinabove, the shadow is a left edge shadow, and therefore, the array 22 would be identical to that shown in FIG. 7. In order to reverse the order of diodes for the array 21, it is merely necessary to rotate the diode array 22 through 180° about one of the end diodes. The shadow edge then covers the later occurring diodes last, as it does with the left edge shadow, and the diode array 21 operates on a right edge shadow. An operation for the right edge shadow for array 21 and the left edge shadow for array 22 as required by the shadow shown in FIG. 8 thereby results.

What is claimed is:

1. A system for detecting the edges of radiation patterns comprising:

an array of radiation sensitive elements arranged in a line;

logic means connecting the individual elements into pairs, said logic means yielding a logic 1 output when one of the elements of a pair are illuminated and a logic 0 for all other illuminations of said pairs of elements, the pairing of said elements being selected so that at least one other element lies between the two elements of a pair to cause the output logic of said system to follow a Gray type of code.

2. The system of claim 1 wherein said radiation patterns are shadows cast in light and said radiation sensitive elements are photodiodes.

3. The system of claim 1 wherein said logic means performs a threshold function, an inverting function and an AND function.

4. The system of claim 1 wherein said logic means includes a transistor, said one of said elements being connected to the base of said transistor and the other element of said pair being connected to the emitter of said transistor.

5. The system of claim 1 wherein said Gray Code has a pair of 1 and 0 logic conditions for each output bit, and the 1 and 0 logic conditions for the pairs are arranged into columns, said 1 and 0 logic conditions in each row being arranged so that the 1 and 0 combination within a column differs from adjacent columns by a single 1 or p; and wherein said elements are paired so that the one element of a pair represents an occurrence of one of said logic conditions in a row and the other element of a pair represents the first occurrence of the other logic condition after said one logic condition in the same row.

6. The system of claim 1 wherein pairs of said elements are grouped so that one pair of elements within each group yields a code bit for each code position within said Gray Code, and an output terminal means commonly connected to the pairs within a group so that all output pulses within a row of said Gray Code appear on a particular output terminal.

7. The system of claim 6 wherein said elements and said logic means are fabricated by integrated circuit techniques onto a single chip.

8. The system of claim 1 wherein said Gray Type Code has n bit accuracy, said system having n output terminals, said pairs of elements being grouped into n groups, and all the pairs within a group being connected to one of said output terminals so that each of said groups provides one bit for each code position.

9. The system of claim 8 wherein said radiation patterns are shadows cast in light, and said elements are photodiodes.

10. The system of claim 9 wherein said logic means includes a transistor, the second of said diodes in a pair being connected to the base of said transistor, the first of said diodes in a pair being connected to the emitter of said transistor, and further including biasing means connected to said base and emitter through said diodes, and resistance means connecting the base and collector of said transistor to ground so that said transistor yields said 1 output when said first diode is illuminated and said 0 output for all other illuminations of said diodes.

* * * * *